United States Patent
Nilsson et al.

(10) Patent No.: US 9,238,535 B2
(45) Date of Patent: Jan. 19, 2016

(54) PACKAGING MATERIAL COMPRISING MAGNETISABLE PORTIONS

(75) Inventors: Tommy Nilsson, Eslöv (SE); Ann-Charlotte Klint, Löddeköpinge (SE); Lars Bergholtz, Höganäs (SE); Istvan Ulvros, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 13/322,852

(22) PCT Filed: May 10, 2010

(86) PCT No.: PCT/SE2010/000129
§ 371 (c)(1),
(2), (4) Date: Nov. 28, 2011

(87) PCT Pub. No.: WO2010/138053
PCT Pub. Date: Dec. 2, 2010

(65) Prior Publication Data
US 2012/0070638 A1     Mar. 22, 2012

(30) Foreign Application Priority Data
May 29, 2009     (SE) ........................................ 0900727

(51) Int. Cl.
*B65B 41/00*     (2006.01)
*B65D 65/38*     (2006.01)
*B65B 57/00*     (2006.01)
*B32B 41/00*     (2006.01)

(52) U.S. Cl.
CPC ............. *B65D 65/38* (2013.01); *B65B 57/00* (2013.01); *B32B 41/00* (2013.01); *Y10T 428/24893* (2015.01)

(58) Field of Classification Search
USPC .......... 428/35.7, 900, 323; 53/396, 51, 131.2, 53/53
See application file for complete search history.

(56) References Cited

U.S. PATENT DOCUMENTS

| 3,237,973 A | 3/1966 | Rumberger |
| 5,704,190 A * | 1/1998 | Kaneko et al. .................... 53/51 |
| 7,765,773 B2 * | 8/2010 | Nilsson et al. ................. 53/396 |
| 2005/0287351 A1 | 12/2005 | Johansson et al. |
| 2007/0018004 A1 | 1/2007 | Gurovich |

(Continued)

FOREIGN PATENT DOCUMENTS

| EP | 0 705 759 A1 | 4/1996 |
| EP | 1 054 343 A1 | 11/2000 |

(Continued)

OTHER PUBLICATIONS

International Search Report (PCT/ISA/210) issued on Aug. 6, 2010, by Swedish Patent Office as the International Searching Authority for International Application No. PCT/SE2010/000129.

(Continued)

*Primary Examiner* — Ellen S Wood
(74) *Attorney, Agent, or Firm* — Buchanan Ingersoll & Rooney PC

(57) ABSTRACT

A packaging material comprises a plurality of magnetizable portions thereon. The magnetizable portions are provided as at least one spot per package to be formed from the packaging material. The spots comprises magnetizable particles.

8 Claims, 2 Drawing Sheets

(56) References Cited

U.S. PATENT DOCUMENTS

| | | |
|---|---|---|
| 2012/0067953 A1 | 3/2012 | Nilsson et al. |
| 2012/0070633 A1 | 3/2012 | Nilsson et al. |
| 2012/0070634 A1 | 3/2012 | Holmström |
| 2012/0073242 A1 | 3/2012 | Nilsson et al. |
| 2012/0074234 A1 | 3/2012 | Nilsson et al. |
| 2012/0076995 A1 | 3/2012 | Nilsson et al. |
| 2012/0077001 A1 | 3/2012 | Klint et al. |

FOREIGN PATENT DOCUMENTS

| | | |
|---|---|---|
| JP | S56-153457 U | 11/1981 |
| JP | S58-198575 A | 11/1983 |
| JP | H07-10108 A | 1/1995 |
| JP | H09-188357 A | 7/1997 |
| JP | 2007-131311 A | 5/2007 |
| RU | 2 292 588 C1 | 1/2007 |
| WO | 97/24278 A1 | 7/1997 |
| WO | WO 2006/135313 A1 | 12/2006 |

OTHER PUBLICATIONS

Office Action issued Jan. 7, 2014, by the Japanese Patent Office in corresponding Japanese Patent Application No. 2012-513010, and an English Translation of the Office Action. (8 pages).

* cited by examiner

PACKAGING MATERIAL COMPRISING MAGNETISABLE PORTIONS

TECHNICAL FIELD

The present invention relates to a packaging material comprising magnetisable portions, wherein the material is intended for forming e.g. food packages.

BACKGROUND

Within packaging technology where a packaging container is formed from a packaging material, it is known to provide the packaging material as a web which prior or during packaging is formed to the packaging container. Guiding marks, e.g. for optical reading has been provided to guide operations when finishing the package, such as forming, sealing, folding, etc. Such guiding marks are sometimes referred to as register marks. The register mark for optical reading is provided during printing of the packing laminate, where e.g. decoration or product information is printed on the packaging material. A problem with such register marks is that they consume a non-negligible area of what becomes the exterior of the package. A further problem is that such a register mark has to rely on the printing being well aligned with other operations performed on the web. It is therefore a desire to provide an improved provision of marking of web of packaging laminate.

SUMMARY

The present invention is based on the understanding that magnetic marking can be provided on a packaging laminate. Storing information in a magnetic recording medium in packing material has been suggested in e.g. EP 705759 A1. In the present disclosure, it is suggested that one or more spots per intended package to be formed from the web is provided on the web, wherein the spots comprise magnetisable particles such that magnetic marking is enabled.

According to a first aspect, there is provided a packaging material comprising a plurality of magnetisable portions thereon, being provided as at least one spot per package to be formed from the packaging material, the spots comprising magnetisable particles.

The spot may be essentially of a geometrical shape chosen from the group consisting of rectangular, square, circular, oval and elongated shape. At least one of the spots may be intended for magnetic position marking and may have an area less than 250 mm$^2$, preferably less than 150 mm$^2$, preferably less than 25 mm$^2$.

The spots may comprise magnetisable particles of an amount between 0.5 and 4 g per m$^2$ print area, preferably between 1.5 and 4 g per m$^2$, preferably about 2 g per m$^2$.

The material may defining a transversal direction being parallel to an imaginary axis of a roll when a web of the material is spooled, and a longitudinal direction perpendicular to the transversal direction, wherein at least one of the magnetisable portions may comprise a strip essentially along the longitudinal direction of the web. The strip may comprise piecewise divided parts, wherein one part is present for each package to be formed from the packing laminate. A division between the parts may be positioned such that sealing of the package to be formed from the packing laminate is enabled at the position of the division. The strip may comprise a magnetic mark indicating a predetermined distance to the intended position of sealing.

The spots may be provided as prints which are made by magnetisable ink comprising magnetisable particles, a solvent and a binder. The magnetisable particles may by chosen from the group consisting of maghemite and hematite. The binder may be chosen from the group consisting of acrylate, acrylics such as styrene acrylic copolymer, polyurethane, nitrocellulose, polyamide and latex. The binder may comprise two of the group, wherein one serves as a dispersant such that the magnetisable particles are evenly dispersed in the ink and the other serves as an adhesive to the packaging material. The amount of binder may be between 20 and 60 percent of weight of the ink, preferably between 40 and 60 percent, preferably between 50 and 55 percent. The ink may further comprise additives, such as waxes and/or antifoaming agent. The waxes may comprise any of a group comprising polyethylene, polypropylene, silicone, polyamide, ethylene vinyl acetate, ethylene butyl acetate, ethylene acrylic acid and polytetrafluoro ethylene. The antifoaming agent may comprise silicone or mineral oil. The solvent may comprise any of a group comprising ethanol, ethylic acetate, water, iso-propanol, glycol, or a retarder solvent. The amount of magnetisable particles may be between 15 and 40 percent by weight of the ink, preferably 30-35 percent by weight.

The size of the magnetisable particles may be between 0.1 and 2.5 μm, preferably between 0.1 and 0.8 μm or preferably between 0.4 and 1.5 μm, preferably about 0.3 μm or preferably about 1 μm.

DETAILED DESCRIPTION

Figure 1:
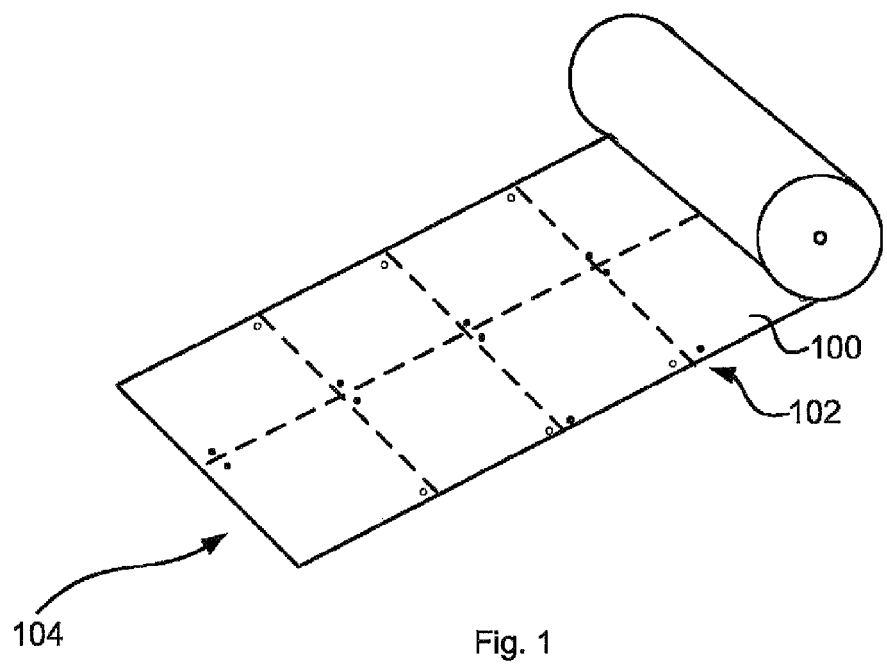
FIG. 1 schematically illustrates a web of packaging laminate according to an embodiment.

FIG. 1 illustrates web 100 of packaging material, where a plurality of magnetisable portions 102 are provided. The magnetisable portions are preferably distributed upon printing them such that there is at least one magnetisable portion 102 per package 104 to be formed from the packaging material. The dashed lines are imaginary and are intended to show the plurality of parts that will form the packages. For reducing the consumption of the magnetic material, e.g. magnetisable ink consumption, the magnetisable portions are provided as spots or the like at parts where magnetic marks are intended to be positioned. Since there is a limited precision in positioning between printing and the assignment of the magnetic mark, cf. the problem with optical marks, the spots are preferably slightly larger than the actual size needed for the magnetic mark. Thus, any reasonable deviation can be handled. Unintentional variations normally occurring in positioning of a magnetisable portion 102 on a web 100 of a packaging material through printing, irrespective of the actually used printing technique, appear in transversal as well as in machine direction of the web during printing. However, variations in positioning of such printed portions very seldom exceed 1 mm in any direction. In order to cope with such variations the invention is at least partly based on a unique relationship between the geometrical size of the printed magnetisable portion and the corresponding geometrical size of a permanent magnet to be used to assign a wanted magnetic information to said portion. This relation can be expressed in metric terms such that any dimension (length and width) of the printed magnetisable portion shall be at least 3 mm larger than the corresponding geometrical dimension of the permanent magnet used to assign the wanted magnetic information to said magnetisable portion. In other words, if the used permanent magnet has a length dimension of L mm in the machine direction of the web to be printed, then the corresponding length dimension of the magnetisable portion shall be at least L+3 mm. Likewise, if the used permanent magnet has a width dimension of B mm in the transversal direction of the web to be printed, then the corresponding width dimension of the magnetisable portion shall be at least B+3 mm to obtain a sufficient size of the magnetisable portion cope with the unavoidable unintentional variations during printing.

The spots are thus provided with magnetisable particles, which can be provided with magnetic marks, and, as will be further elucidated below, depending on the form and size of the spots, be provided with more complex information by modulated magnetisation. The packaging material is preferably a laminate, or a single layer material such as a polymer material.

Figure 2:
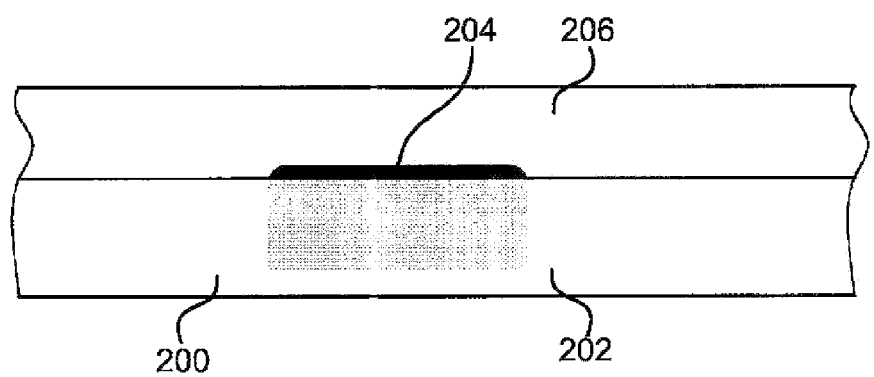
FIG. 2 illustrates an example of laminate structure.
Figure 3:
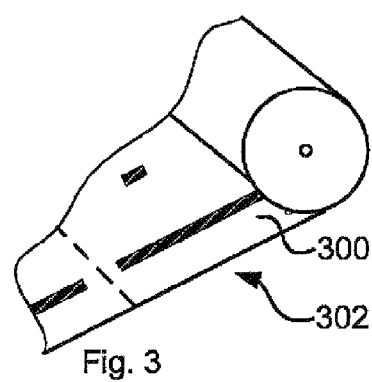
FIG. 3 schematically illustrates a web of packaging laminate according to an embodiment with regard to positions of magnetisable portions.
Figure 4:
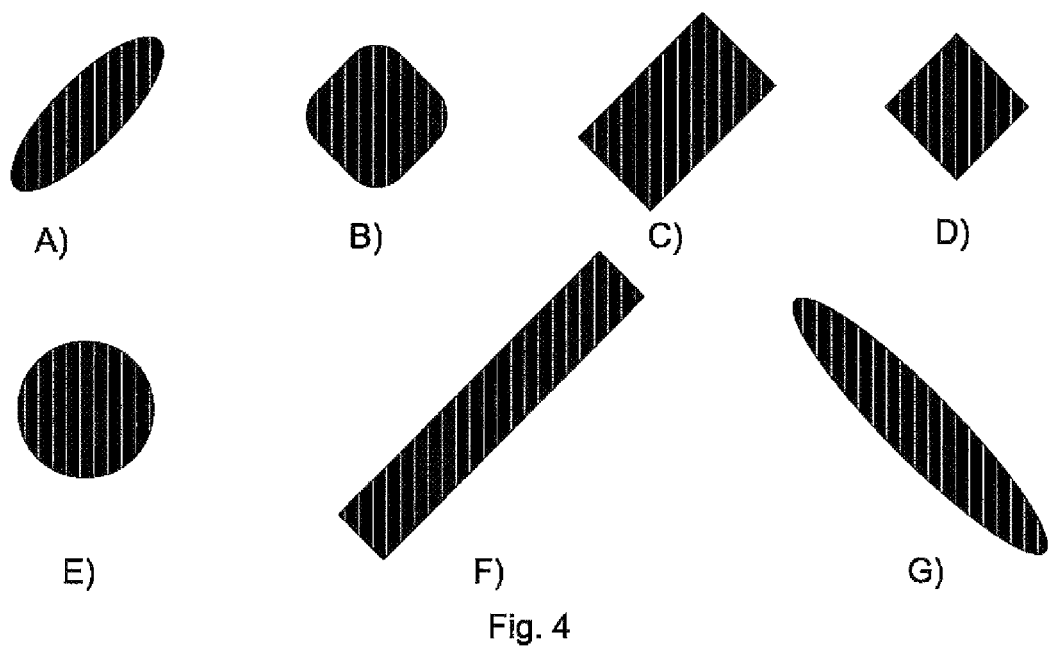
FIG. 4 illustrates different examples of shapes of magnetisable portions.

FIG. 2 illustrates that the packing laminate 200 can comprise a layer of paper 202, on which the printing of the magnetisable portions 204 can be made, and one or more layers of plastic coating 206. Here, the term plastic coating should be construed as any coating including suitable polymers for food containers. The packing laminate can also comprise a metal foil layer. To be able to write and read the magnetic mark through the metal foil layer, the metal is preferably non-ferromagnetic, such as aluminium. The print of the magnetisable portions is preferably made on a side of the layer it is printed on of the laminate facing towards the intended interior of the package to be formed. Thus, it does not interfere with exterior printing of e.g. decorations or product information on the package. The print is preferably made by using a magnetisable ink as demonstrated above, FIG. 3 illustrates a web of packaging laminate 300, comprising a plurality of magnetisable portions 302. The magnetisable portions can be distributed such that there is at least one or more magnetisable portions per package to be formed from the packaging laminate 300. The magnetisable portions comprise magnetisable particles, e.g. provided by a magnetisable ink as will be demonstrated below. The magnetisable portions or "spots" can have a variety of shapes, as illustrated in FIG. 4, depending on the magnetic mark and the intention of the magnetic mark it is supposed to carry. The spots can be square, rectangular, circular, oval, or have an elongated shape being oriented in a longitudinal or transversal direction of the web. The size of the spot is chosen depending on the size of the mark it is supposed to carry. Preferably, the size of the spot is slightly larger to alleviate any problem in positioning deviation between printing of the spot and providing the magnetic mark to it. A larger spot is of course able to carry more magnetisation, which can be used for increasing magnetic field of a low-information carrying mark which thus will be easier to read, especially under harsh signal conditions, or be provided with more complex information, such as carrying information about the web or the particular part of the web. For a low-information carrying mark, the spot can have an area of 250 mm$^2$ or less, which for a square spot equals a side of about 15-16 mm, or a circular spot with a diameter of about 17-18 mm. For many applications, an area of 150 mm$^2$ or less is enough, and for some applications, an area of 25 mm$^2$ or even less may be sufficient. A magnetisable portion for carrying complex data, an elongated spot or bar can be suitable. By providing the elongated portion such that it stretches along a longitudinal direction of the web, sequential writing and reading of the complex data is neatly enabled as the web moves during manufacturing of the web and/or finishing of the packages.

The printed spots preferably comprise an amount of magnetic particles of between 0.5 and 4 g per m$^2$ spot area. Lower amounts may reduce ability to provide the magnetic information, and higher amounts may only increase consumption of magnetisable ink without improving the information carrying abilities. Printing larger amounts may also be a problem, especially at high-speed printing, since the ink may cause problems with setting-off. A preferable amount is between 1.5 and 4 g per m$^2$ to ensure information carrying abilities under various conditions. A fair trade-off of secure reading/writing, printing, and economy in ink consumption gives about 2 g per m$^2$.

The positioning of an elongated spot or bar can be positioned a predetermined distance from a longitudinal border of the web, wherein the data provided in the bar also can be used for alignment of the web in some applications.

The elongated spot or bar can be part of a strip along the web, being piecewise divided such that there is one part present for each package to be formed. The division is preferably positioned such that sealing of the package to be formed is enabled at the position of the division where there is no magnetisable print. The strip can have a magnetic mark indicating the sealing position by being arranged at a predetermined distance from the sealing position.

A magnetisable ink is provided such that magnetisable portions can be provided on the packaging material. The ink comprises magnetisable particles for provision of the magnetic features of the magnetisable portions.

The ink further comprises a solvent. Purpose of the solvent can be to keep a system for distributing the ink at printing flowing and open. The solvent can be water-based or monomer-based. Examples on solvents are ethanol, ethylic acetate, water, iso-propanol, glycol, or a retarder solvent.

The ink further comprises a binder, such as acrylate, styrene acrylic copolymer, polyurethane, nitrocellulose, polyamide, or latex. The binder can comprise a mix of several components, e.g. of those mentioned above, in order to give the ink needed properties. The properties to be considered are help to disperse and stabilise magnetic particles in the ink, to transport the magnetic particles during a printing process, to give adhesion to a substrate on which the print is made, i.e. on a layer of the laminate. Further properties to be considered are protection of the magnetic particles after printing and providing proper printing properties. For example, one component of the binder can serve as a dispersant for dispersing the magnetic particles evenly in the ink, while another can serve as and adhesive to the laminate, etc. For providing an ink that is suitable for high speed printing, the amount of binder can be between 20 and 60 percent of the weight of the ink, i.e. wet weight. A suitable amount has been found to be between 40 and 60 percent. Using between 50 and 55 percent has worked well.

The ink can further comprise additives, such as waxes and/or antifoaming agent. Suitable waxes can be polyethylene, polypropylene or polytetrafluoro ethylene, silicone, polyamide, ethylene vinyl acetate, ethylene butyl acetate, ethylene acrylic acid, etc. The amount of wax may be varied, but should be enough to prevent the ink from setting-off or smudge. Suitable antifoaming agents can be silicone or mineral oils. The amount of antifoaming agent should be enough for preventing the ink from foaming during printing on the moving web, especially at high-speed printing.

The ink can be prepared by mixing the magnetisable particles with the binder, e.g. by continuous shearing or stirring. The adding of particles, which may be made in portions, may be interrupted when the mix reaches about 40 to 50 degrees centigrade, and immediately adding any additives, e.g. the antifoam agent and/or the waxes, and the fluid such that the ready-to-use ink is provided.

The magnetisable particles can be hematite or maghemite, or a combination thereof. These minerals are suitable for food packages since there is no restriction whether they may be in contact with the foodstuffs. The amount of magnetisable particles is between 15 and 40 percent weight of the ink, preferably 30-35 percent by weight.

The size of the magnetisable particles, i.e. a length across the particle, a diameter, etc. depending on the assumed shape of the particle, has been found to give more or less beneficial properties of a remaining magnetic field (remanence) when a magnetic mark is applied on a spot printed by the magnetisable ink. Smaller particles, i.e. in the magnitude of 0.1 μm, may be more dispersed, but each particle can of course hold less remaining magnetic field (remanence). Also, depending on the choice of binder, solvent, etc., the dispersion of such small particles may in practice be an issue, where lumping of the small particles may be an issue during preparation and handling of the ink. On the other hand, larger particles, i.e. in the magnitude of one or a few μm, may of course not be that dispersed as the smaller particles, but each particle can hold more remaining magnetic field (remanence), and the lumping of particles will be less apparent. A further increase of particle size has been found not to increase the aggregate remaining magnetic field (remanence) that can be held with the amount of ink of the spots kept constant. Thus a suitable the size of the magnetisable particles can be between 0.1 and 2.5 μm. Preferable sizes can be between 1 and 8 μm for one embodiment, or between 0.4 and 1.5 μm for a further embodiment. A small particle approach can for example be having particles with a size of about 0.3 μm to provide a suitable trade-off between dispersion and the issue of lumping. Another approach can be to have particles with a size of about 1 μm to enable each particle to provide a significant amount of magnetic field and to minimize the issue of lumping. A further embodiment can be to have a particle size of about 0.4, 0.5, 0.6 or 0.7 μm to provide a little of both of the benefits for the two other examples given above. Here, the size given as "about" should be interpreted in the light of both that the shape of the particles may not give a certain geometric distance to measure, and that there is a natural spread in the sizes of the particles due to the preparation of them. Say for example that a particle size of a half micrometer is chosen, but the particles are prepared by grinding and have a slightly irregular shape. Thus, an average particle can then be a half micrometer across its largest available direction, while it only is 0.35 μm across its smallest direction. Further, for the largest direction, 80 percent of the particles may have a spread between 0.45 and 0.55 μm, while the remaining 20 percent may be out of that range, especially towards smaller particles caused by the grinding. The example is of course applicable for any chosen size. The spread can also be decreased by screening the particles after grinding.

The invention claimed is:

1. A packaging material comprising:
   a packaging laminate web sized to form a plurality of packages and extending length-wise along a longitudinal direction;
   a plurality of spots provided on the packaging laminate web and spaced apart along the longitudinal direction so that at least one of the spots is positioned on a portion of the packaging laminate web that will form each of the plurality of packages;
   each of the plurality of spaced apart spots comprising magnetisable particles, the magnetisable particles extending over an area of each respective spot, and some of the magnetisable particles in each spot being magnetized so that a total area of magnetized particles in each respective spot is less than the total area over which the magnetisable particles of the respective spot extend.

2. The material according to claim 1, wherein at least one of the spots of magnetisable particles possesses a geometrical shape chosen from the group consisting of rectangular, square, circular, oval and elongated shape.

3. The material according to claim 1, wherein at least one of the spots of magnetisable particles has an area less than 25 $mm^2$.

4. The material according to claim 1, wherein at least one of the spots of magnetisable particles is printed in a print area and comprises magnetisable particles in an amount between 0.5 g and 4 g per $m^2$ print area.

5. A packaging material comprising a packaging laminate web configured to form a plurality of packages and extending length-wise along a longitudinal direction, with plural spots provided on the packaging laminate web and spaced apart along the longitudinal direction such that at least one spot is provided on each of the plurality of packages to be formed, each of the plural spots including magnetised particles in a magnetized area possessing an outer periphery, each of the plural spots also including magnetisable particles in a magnetisable portion which extends outwardly beyond the outer periphery of the magnetized area by at least 3 mm.

6. The material according to claim 5, wherein the outer periphery of the magnetized area possess a rectangular shape with a length L and a width w, the magnetisable portion possessing a length of at least L+3 mm and a width of at least w+3 mm.

7. The material according to claim 5, wherein each of the spots has an area less than 25 $mm^2$.

8. The material according to claim 5, wherein the magnetisable particles are printed in the magnetisable portion in an amount between 0.5 g and 4 g per $m^2$ print area.

* * * * *